(12) United States Patent
Yu et al.

(10) Patent No.: US 12,229,391 B2
(45) Date of Patent: Feb. 18, 2025

(54) MESSAGE SELECTION METHOD, APPARATUS AND DEVICE

(71) Applicant: Beijing Zitiao Network Technology Co., Ltd., Beijing (CN)

(72) Inventors: Jie Yu, Beijing (CN); Jiachen Zhao, Beijing (CN); Qiyang Liu, Beijing (CN); Huabin Tian, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/520,062

(22) Filed: Nov. 27, 2023

(65) Prior Publication Data

US 2024/0094883 A1 Mar. 21, 2024

Related U.S. Application Data

(63) Continuation of application No. PCT/CN2022/104881, filed on Jul. 11, 2022.

(30) Foreign Application Priority Data

Jul. 14, 2021 (CN) .................. 202110796100.X

(51) Int. Cl.
  *G06F 3/04842* (2022.01)
  *G06F 3/04845* (2022.01)
  (Continued)

(52) U.S. Cl.
  CPC ...... *G06F 3/04842* (2013.01); *G06F 3/04845* (2013.01); *G06F 3/0486* (2013.01); *H04L 51/04* (2013.01)

(58) Field of Classification Search
  CPC ............ G06F 3/04842; G06F 3/04845; G06F 3/0486; H04L 51/04
  See application file for complete search history.

(56) References Cited

U.S. PATENT DOCUMENTS

2010/0057854 A1 3/2010 Chinnam et al.
2014/0325390 A1 10/2014 Romero et al.
(Continued)

FOREIGN PATENT DOCUMENTS

CN 104142789 A 11/2014
CN 108449260 A 8/2018
(Continued)

OTHER PUBLICATIONS

Notice of Reasons for Refusal for Japanese Patent Application No. 2023-572821, mailed on Oct. 1, 2024, 10 pages.

*Primary Examiner* — Jennifer N Welch
*Assistant Examiner* — Parmanand D Patel
(74) *Attorney, Agent, or Firm* — Astute IP Law Group

(57) ABSTRACT

A message selection method, a message selection apparatus, an electronic device, a computer-readable storage medium, and a computer product is provided. The method includes: displaying a first control in a message window in response to an operation of entering a message multi-selection mode triggered by a user, wherein the first control is used to select multiple messages; determining a target position of the first control in a message in the message window in response to a position changing operation by the user on the first control; and selecting messages below the target position in response to a triggering operation by the user on the first control.

15 Claims, 5 Drawing Sheets

(51) Int. Cl.
  *G06F 3/0486*    (2013.01)
  *H04L 51/04*     (2022.01)

(56) References Cited

U.S. PATENT DOCUMENTS

| | | | | |
|---|---|---|---|---|
| 2015/0169208 A1* | 6/2015 | Cho | ................... | H04L 12/1827 |
| | | | | 715/752 |
| 2016/0295384 A1* | 10/2016 | Shan | ....................... | H04W 4/08 |
| 2017/0155521 A1* | 6/2017 | Zhang | .................. | H04L 51/046 |
| 2018/0109413 A1* | 4/2018 | Ito | ........................ | H04L 41/0883 |
| 2018/0302357 A1* | 10/2018 | Cohen | .................... | H04L 51/212 |

FOREIGN PATENT DOCUMENTS

| | | | | | |
|---|---|---|---|---|---|
| CN | 109358792 | A | | 2/2019 | |
| CN | 110059241 | A | | 7/2019 | |
| CN | 110174980 | A | | 8/2019 | |
| CN | 110704446 | A | | 1/2020 | |
| CN | 110855549 | A | | 2/2020 | |
| CN | 112702255 | A | * 4/2021 | ............ | H04L 51/04 |
| CN | 114461101 | A | | 5/2022 | |
| JP | 2012014210 | A | | 1/2012 | |
| JP | 2014096798 | A | | 5/2014 | |
| JP | 2018506791 | A | | 3/2018 | |

\* cited by examiner

MESSAGE SELECTION METHOD, APPARATUS AND DEVICE

CROSS-REFERENCE TO RELATED APPLICATION

The present application is a continuation of International Patent Application No. PCT/CN2022/104881, filed on Jul. 11, 2022, which claims the priority of Chinese Patent Application No. 202110796100.X titled "A MESSAGE SELECTION METHOD, APPARATUS AND DEVICE" filed on Jul. 14, 2021 in the Chinese Patent Office, and the entire content disclosed by the Chinese patent application is incorporated herein by reference as part of the present application.

TECHNICAL FIELD

The present application relates to computer processing technologies, and in particular, to a message selection method, apparatus and device.

BACKGROUND

With the continuous development of Internet technology, more and more functions have arisen to facilitate to meet user's requirements. Instant Messaging (IM) has become an important assistant for people's work, since effective communication can be achieved through IM. In some application scenarios, there is a need for the user to select multiple pieces of information in a conversation, such as a scenario for forwarding multiple messages. When there is a need to select a large number of messages, the user needs to select the messages one by one, consuming enormous time and energy, and thus degrading user experience.

SUMMARY

In view of this, the embodiments of the present application provide a message selection method, apparatus and device to automatically help the user to select multiple messages, thus reducing user operations and improving user experience.

In order to realize the above purpose, technical schemes provided by the embodiments of the present application are as follows:

In a first aspect of the embodiments of the present application, there is provided a message selection method comprising:

displaying a first control in a message window in response to an operation of entering a message multi-selection mode triggered by a user, wherein the first control is used to select multiple messages;

determining a target position of the first control in a message in the message window in response to a position changing operation by the user on the first control;

selecting messages below the target position in response to a triggering operation by the user on the first control.

In a second aspect of the embodiments of the present application, there is provided a message selection apparatus, the apparatus comprising:

a display unit, used to display a first control in a message window in response to an operation of entering a message multi-selection mode triggered by a user, wherein the first control is used to select multiple messages;

a determination unit, used to determine a target position of the first control in a message in a message window in response to a position changing operation by the user on the first control;

a selection unit, used to select messages below the target position in response to a triggering operation by the user on the first control.

In a third aspect of the embodiments of the present application, there is provided an electronic device comprising a processor and a memory;

the memory is used to store instructions or computer programs; and the processor is used to execute the instructions or computer programs in the memory to cause the electronic device to perform the method described in the first aspect.

In a fourth aspect of the embodiments of the present application, there is provide a computer-readable storage medium comprising instructions which, when executed on a computer, cause the computer to perform the method described in the first aspect.

In a fifth aspect of the embodiments of the present application, there is provided a computer program product comprising a computer program carried on a non-transient computer-readable medium, wherein the computer program includes program code for performing the method described in the first aspect.

Accordingly, it can be seen that, the embodiments of the present application have beneficial effects as follows:

According to the technical scheme provided by the embodiments of the present application, upon detecting an operation of entering a message multi-selection mode triggered by a user, the message multi-selection mode is entered, and a first control is displayed in a message window. The first control is used to select multiple messages. In response to a position changing operation by the user on the first control, a target position of the first control in a message in the message window is determined. Upon detecting a triggering operation by the user on the first control, messages below the target position are selected. That is, the user can adjust the target position of the first control in the message according to own requirements, and then select multiple messages below the target position by triggering the first control. It can be seen that the technical scheme provided by the embodiments of the present application can not only help the user to automatically select multiple messages, but also select messages at specific positions according to the user's requirements, thereby improving user experience.

DETAILED DESCRIPTION

In order to make the above objectives, features and advantages of the present application more obvious and easier to understand, the embodiments of the present application will be further illustrated in detail below, in conjunction with the accompanying drawings and specific embodiments. It can be understood that the specific embodiments described herein are merely used to explain the present application, but are not limited to the present application. Additionally, it should be noted that, for the convenience of description, only the parts related to the present application, instead of all the structures, are shown in the accompanying drawings.

At present, in some instant messaging (IM) software, for the convenience of user operations, a message multi-selection function is provided. However, when the user needs to select a large number of messages, he/she needs to select them one by one, consuming enormous time and energy, resulting in low work efficiency and degrading user experience.

Based on this, the embodiments of the present application provide a message selection method, according to which, in a conversation interface, a message selection mode is entered in response to a triggering operation by a user. In the message multi-selection mode, a first control is displayed in a message window, wherein multiple messages can be selected through the first control. In the message multi-selection mode, the user can adjust a position of the first control in a message according to the user's own requirements, and determine a target position of the first control in the message in the message window in response to a position changing operation by the user on the first control. In response to a triggering operation by the user on the first control, multiple messages below the target position can be selected at one time.

For the convenience of understanding, the message selection method provided by the embodiments of the present application will be illustrated below in conjunction with the accompanying drawings.

Figure 1:
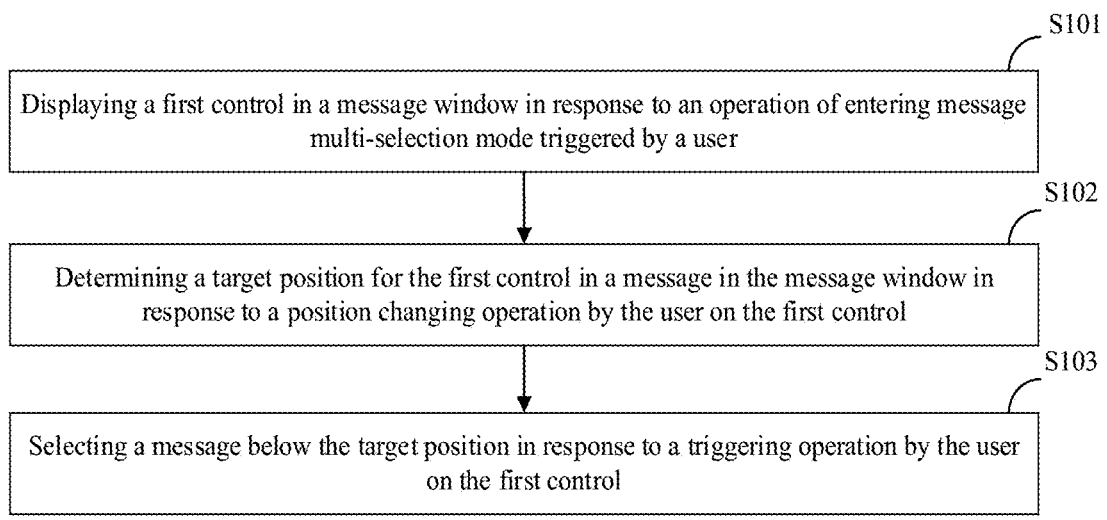
FIG. 1 is a flowchart of a message selection method provided by an embodiment of the present application.

Referring to FIG. 1, FIG. 1 is a flowchart of a message selection method provided by an embodiment of the present application. As shown in FIG. 1, the method may comprise:

S101: displaying a first control in a message window in response to an operation of entering a message multi-selection mode triggered by a user.

In this embodiment, when the user needs to select multiple messages in a conversation, he/she may enter the message multi-selection mode through a preset triggering operation. After entering the message multi-selection mode, the first control will be displayed in the message window, and the first control is used to select multiple messages. A number of the multiple messages that can be selected through the first control may be preset. For example, if it is pre-defined that 100 messages can be selected through the first control, then 100 messages can be selected at one time through the first control. Specifically, the user may trigger the entering into the message multi-selection mode in the following ways.

Figure 2A:
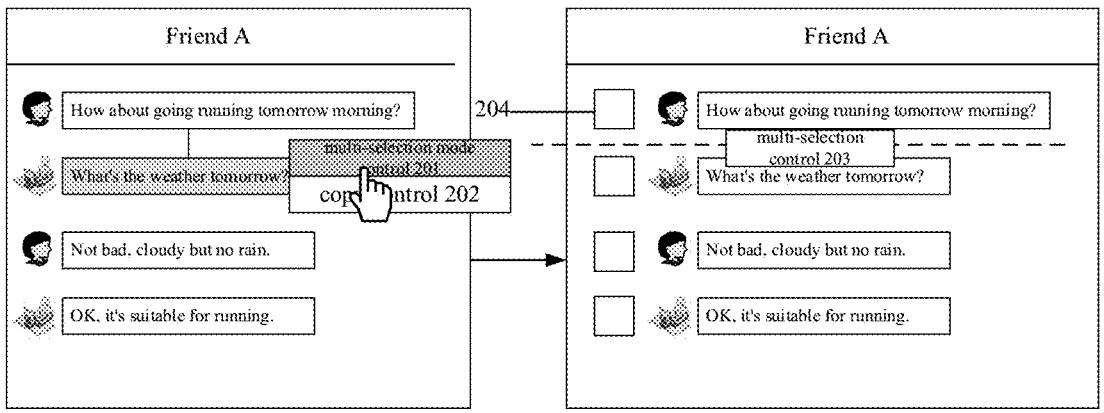
FIG. 2a is a schematic diagram of entering a message multi-selection mode provided by an embodiment of the present application.

In an example, a third control is displayed in response to a triggering operation by the user on a first message in the message window; and the first control is displayed in the message window in response to a triggering operation by the user on the third control. The first message may be one of multiple messages that the user needs to select. For example, as shown in FIG. 2a, the user selects a message to be selected in the conversation interface, and right-clicks to display controls such as a multi-selection mode control 201 (the third control), a copy control 202 and the like. The user clicks on the multi-selection mode control 201 to enter the message multi-selection mode, in which a message multi-selection control 203 (the first control) and a plurality of selection boxes 204 are displayed. the dotted line in FIG. 2a is used to indicate the position of the multi-selection control 203.

Figure 2B:
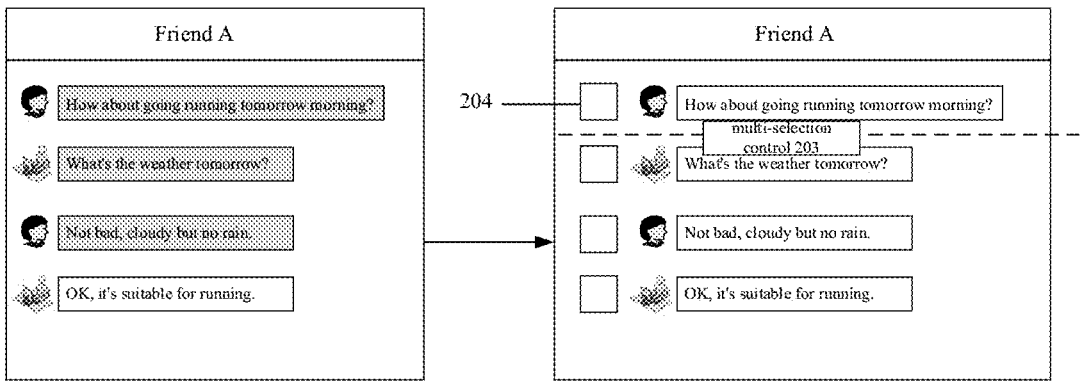
FIG. 2b is another schematic diagram of entering a message multi-selection mode provided by an embodiment of the present application.

In another example, the message multi-selection mode is entered in response to the user box-selecting multiple messages in the conversation interface. That is, when it is detected that the user box-selects multiple messages in the conversation interface, the conversation application automatically enters the message multiple-selection mode. For example, as shown in FIG. 2b, by scrolling the mouse, the user box-selects multiple messages in the conversation interface frame. Upon identifying that the user box-selects multiple messages, the application automatically enters the multi-selection mode, in which the message multi-selection control 203 (the first control) and the plurality of selection boxes 204 are displayed.

In some application scenarios, when the number of messages included in the conversation interface is relatively small or the length of the messages is relatively small, the user may manually select without triggering to enter the message multi-selection mode, thereby simplifying user operations. In an example, in response to a triggering operation by the user and a number of messages in a conversation record being greater than or equal to a preset lower limit number of messages, the message multi-selection mode is entered, and the first control is displayed in the message window. The preset lower limit number can be set according to actual situation. For example, the preset lower limit number is 5. When the number of messages included in the conversation record is greater than or equal to 5, in response to a triggering operation by the user, the message multi-selection mode is entered, and the first control is displayed in the message window; or when the number of messages included in the conversation record is smaller than 5, the user may manually select without entering the message multi-selection mode. In another example, in response to a triggering operation by the user, the number of messages in the conversation record being smaller than the preset lower limit number of messages and the length of messages in the message window being greater than or equal to a preset length, the message multi-selection mode is entered, and the first control is displayed in the message window. That is, even if the number of messages in the conversation record is smaller than the preset lower limit number, in the case that the length of messages in the conversation record is greater than or equal to the preset length, if the user needs to select multiple messages and triggers a page sliding operation, then in response to the triggering operation by the user, the message multi-selection mode is entered, and the first control is displayed in the message window. The length of the messages may be set according to actual application situation. For example, if the length of all messages in the conversation interface exceeds that of a display screen, then in response to a triggering operation by the user, the message multi-selection mode is entered, and the first control is displayed in the message window.

S102: determining a target position of the first control in a message in the message window in response to a position changing operation by the user on the first control.

Figure 2C:
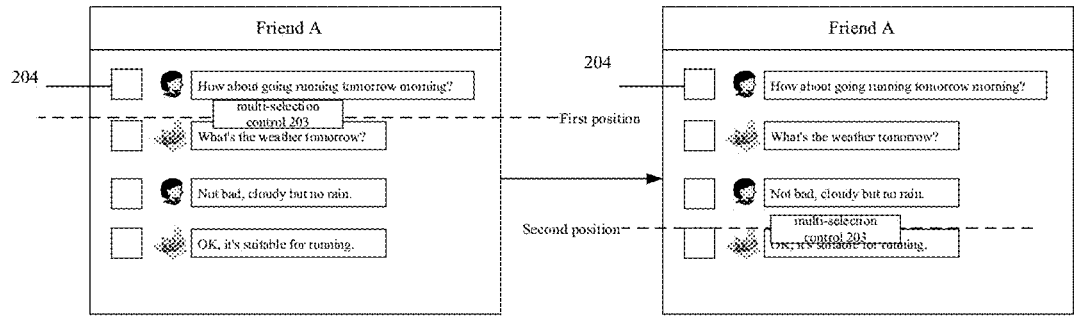
FIG. 2c is a schematic diagram of a dragging scenario provided by an embodiment of the present application.
Figure 2D:
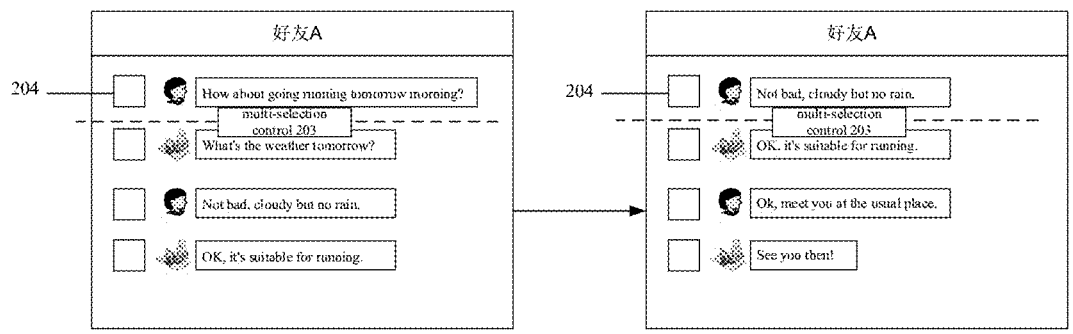
FIG. 2d is a schematic diagram of a scrolling scenario provided by an embodiment of the present application.

In the message multi-selection mode, the user may adjust the position of the first control in a message in the message window according to the user's own requirements. In an example, the user may drag the first control freely to move the first control to a position for a message that needs to be selected. When the user stops the dragging operation, the position to which the first control is finally dragged is determined as the target position of the first control in the message in the message window. That is, by adjusting the position of the first control, multiple messages required by the user can be selected, thereby improving user experience. For example, as shown in FIG. 2c, the user drags the first control from a first position to a second position. When the first control is dragged to the second position and the dragging stops, the second position is determined as the target position of the first control in the message in the message window. In another example, in response to a scrolling operation by the user on message content in the message window, the position of the first control in the message window is kept unchanged. The message content displayed in the message window is determined according to the scrolling operation. For example, as shown in FIG. 2d, the position of the first control is kept unchanged, and the user performs a scrolling operation on the message content in the message window, so that the message content displayed in the message window changes.

S103: selecting messages below the target position in response to a triggering operation by the user on the first control.

After the first control is dragged to the target position, multiple messages below the target position are selected in response to the triggering operation by the user on the first control. A number of selected messages below the target position may be set according to actual requirements. In an example, all messages below the target position may be selected. That is, there is no upper limit on the number of selected messages, and every message below the target position will be selected. In another example, a preset upper limit number of messages below the target position are selected, wherein the preset upper limit number refers to a maximum number of messages that can be selected. That is, by triggering the first control, a preset upper limit number of messages will be selected at most. When the number of messages below the target position is smaller than the preset upper limit number, then by triggering the first control, all messages below the target position will be selected. When the number of messages below the target position is greater than or equal to the preset upper limit number, then by triggering the first control, the preset upper limit number of messages below the target position will be selected in sequence. For example, if the preset upper limit number is 100 and the number of messages below the target position is 150, then by triggering the first control, 100 messages will be selected from top to bottom from the target position.

Preferably, in order to improve user experience and facilitate the user to view the maximum number of messages selectable through the first control, if the number of messages below the target position is smaller than the preset upper limit number, the preset upper limit number may be displayed in the first control.

As can be seen from the above description, upon detecting a triggering operation by a user, upon detecting an operation of entering the message multi-selection mode triggered by the user, the message multi-selection mode is entered, and the first control is displayed in a message window. The first control is used to select multiple messages. In response to a position changing operation by the user on the first control, a target position of the first control in a message in the message window is determined. Upon detecting a triggering operation by the user on the first control, messages below the target position are selected. That is, the user can adjust the target position of the first control in the message according to own requirements, and then select multiple messages below the target position by triggering the first control. It can be seen that the technical scheme provided by the embodiments of the present application can not only help the user to automatically select multiple messages, but also select messages at specific positions according to the user's requirements, thereby improving user experience.

Figure 2E:
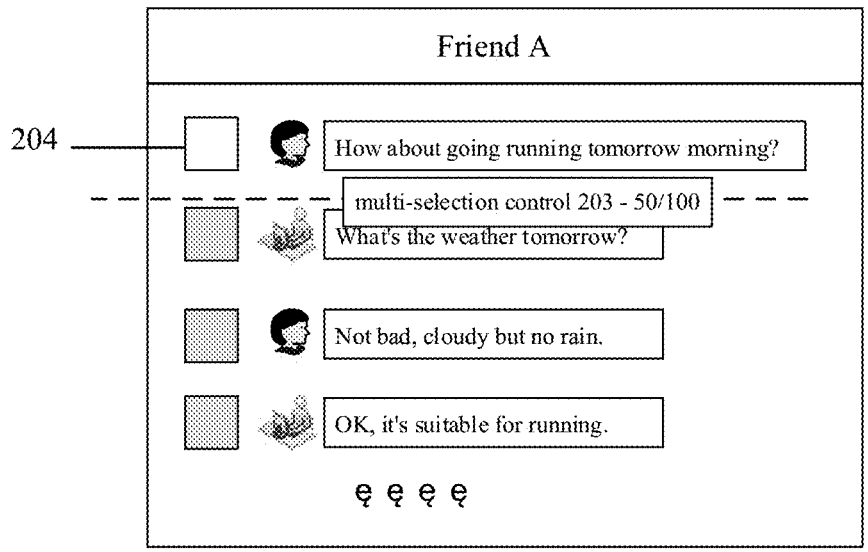
FIG. 2e is a display effect diagram provided by an embodiment of the present application.

In an application scenario, in order to facilitate the user to intuitively view the number of selected messages, the number of selected messages is displayed in the first control in response to the triggering operation by the user on the first control. For example, as shown in FIG. 2e, in response to the triggering operation by the user on the message multi-selection control, a selected number 50/100 is displayed, where 50 represents the number of currently selected messages and 100 is the preset upper limit number.

In some application scenarios, when the messages selected through the first control includes some messages that don't need to be selected, such messages may be deselected. The number of selected messages displayed in the first control is updated in real time in response to a deselecting operation on a portion of the selected messages by the user.

Figure 3A:
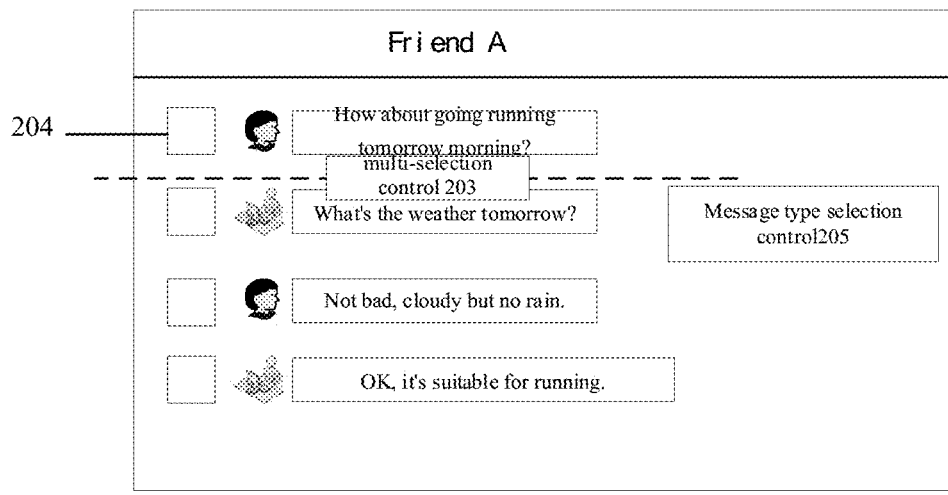
FIG. 3a is a schematic diagram of a type of message selection provided by an embodiment of the present application.
Figure 3B:
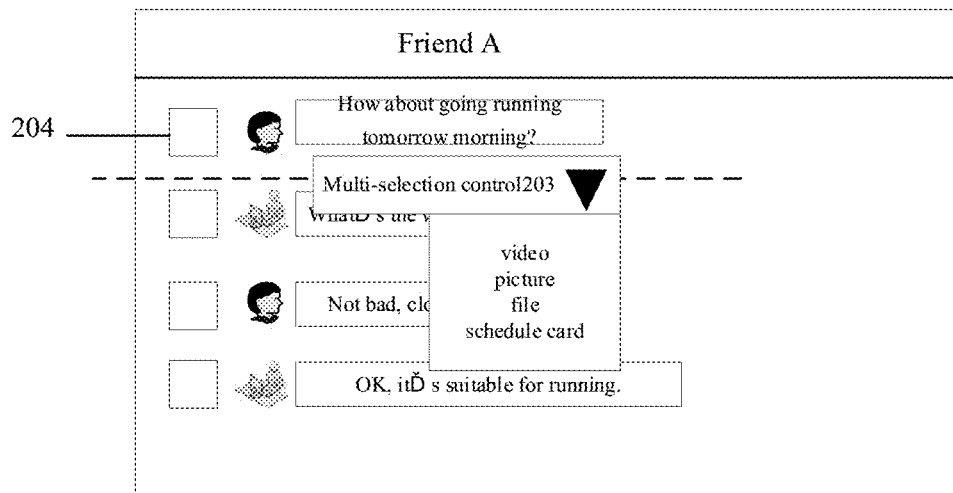
FIG. 3b is a schematic diagram of another type of message selection provided by an embodiment of the present application.

In some application scenarios, in order to select a specific type of message according to the user's requirements and improve user experience: a second control is displayed in response to an operation of entering a message filtering mode triggered by the user; messages corresponding to a target type below the target position are selected in response to a selecting operation on the target type in the second control by the user. The second control is used to select different types of messages, which may include videos, pictures, files, schedule cards, etc. The layout with respect to the second control may be set according to actual requirements. For example, the second control may be displayed as an independent control in the message window. As shown in FIG. 3a, the message multi-selection control 203 (the first control) and a message type selection control 205 (the second control) are displayed as independent controls in the message window, respectively. Alternatively, the second control may be deployed in the first control and shown in the form of a drop-down menu. As shown in FIG. 3b, a drop-down menu is displayed by the user triggering the first control 203. The user may select a desired target type through the drop-down menu 205.

Figure 3C:
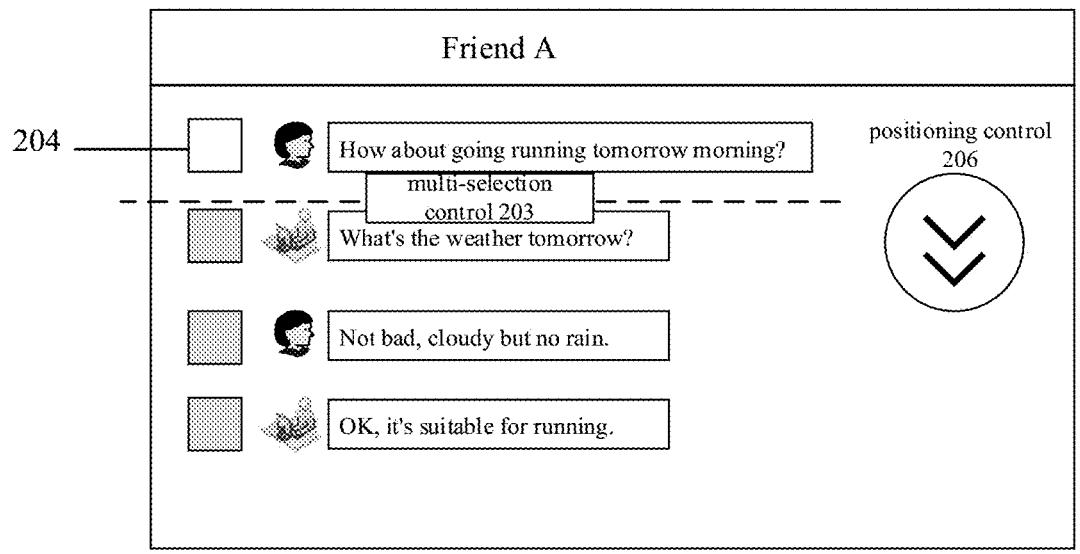
FIG. 3c is a schematic diagram of a jumping scenario provided by an embodiment of the present application.

In some application scenarios, when multiple messages are selected through the first control, a fourth control may be displayed. In response to a triggering operation by the user on the fourth control, the screen jumps to a position where the last one of the selected messages is. That is, the screen may directly jump to the position where the last one of the selected messages is by the user triggering the fourth control, so that the user can intuitively view the last one of the selected messages. For example, as shown in FIG. 3c, upon selecting multiple messages, a positioning control 206 (the fourth control) is displayed. In response to a triggering operation by the user on the positioning control 206, the screen jumps to the position where the last one of the selected messages is.

Figure 3D:
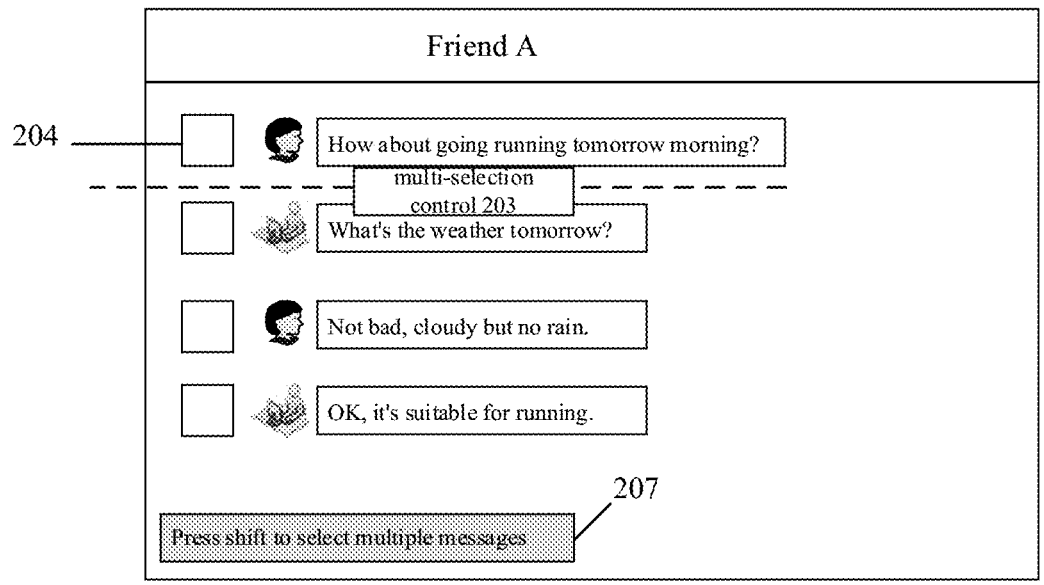
FIG. 3d is a schematic diagram of an information prompting scenario provided by an embodiment of the present application.

In some application scenario, after entering the message multi-selection mode, a prompt message may be displayed in the message window for prompting that multiple messages may be selected through a target key, so that the user may quickly select multiple messages through the target key. For example, as shown in FIG. 3d, after entering the message multi-selection mode, a prompt message 207 is displayed in the message window for prompting that multiple messages may be selected by pressing the shift key.

Based on the method embodiments described above, the embodiments of the present application provide a message selection apparatus, which will be described below with reference to the accompanying drawings.

Figure 4:
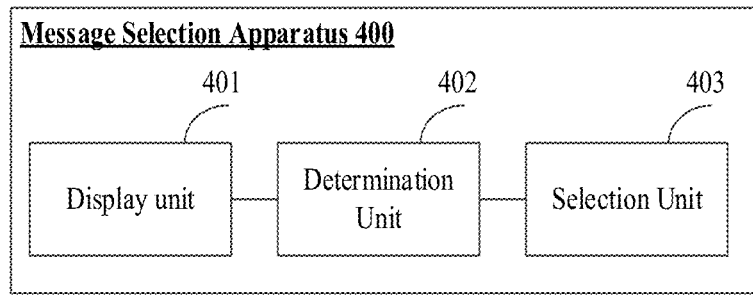
FIG. 4 is a structural diagram of a message selection apparatus provided by an embodiment of the present application.

Referring to FIG. 4, FIG. 4 is a structural diagram of a message selection apparatus provided by an embodiment of the present application. As shown in FIG. 4, the apparatus 400 may comprise a display unit 401, a determination unit 402 and a selection unit 403, wherein:

the display unit 401 is used to display a first control in a message window in response to an operation of entering a message multi-selection mode triggered by a user, wherein the first control is used to select multiple messages;

the determination unit 402 is used to determine a target position of the first control in a message in the message window in response to a position changing operation by the user on the first control; and the selection unit 403 is used to select messages below the target position in response to a triggering operation by the user on the first control.

In a specific implementation, the determination unit 402 is specifically used to:

determine the target position of the first control in the message in the message window according to the position to which the first control is finally dragged, in response to an operation of dragging the first control in the message window by the user; or keep the position of the first control in the message window unchanged, in response to a scrolling operation by the user on message content in the message window, and determine the message content shown in the message window according to the scrolling operation.

In a specific implementation, the display unit 401 is further used to display a second control in response to an operation of entering a message filtering mode triggered by the user, wherein the second control is used to select different types of messages;

The selection unit 403 is specifically used to select messages corresponding to a target type below the target position in response to a selecting operation on the target type in the second control by the user.

In a specific implementation, the display unit 401 is specifically used to: display a third control in response to a triggering operation by the user on a first message in the message window; and display the first control in the message window in response to a triggering operation by the user on the third control; or display the first control in the message window in response to an operation of box-selecting multiple messages in the message window by the user.

In a specific implementation, the selection unit 403 is specifically used to: select all messages below the target position; or select a preset upper limit number of messages below the target position, wherein the preset upper limit number is a maximum number of messages that can be selected.

In a specific implementation, the display unit 401 is specifically used to display the preset upper limit number in the first control.

In a specific implementation, the apparatus further comprises a jump unit;

the display unit 401 is further used to display a fourth control;

the jump unit is used to jump to a position where the last one of the selected messages is in response to a triggering operation by the user on the fourth control.

In a specific implementation, the display unit 401 is specifically used to: enter the message multi-selection mode and display the first control in the message window, in response to a triggering operation by the user and a number of messages in a conversation record being greater than or equal to a preset lower limit number of messages; or enter the message multi-selection mode and display the first control in the message window, in response to a triggering operation by the user, the number of messages in the conversation record being smaller than the preset lower limit number of messages and the length of messages in the message window being greater than a preset length.

In a specific implementation, the display unit 401 is further used to display a number of selected messages in the first control.

In a specific implementation, the apparatus further comprises an update unit;

the update unit is used to update the number of selected messages displayed in the first control in real time in response to a deselecting operation on a portion of the selected messages by the user.

It should be noted that the implementation of respective units in this embodiment can be found the relevant description in the method embodiment shown in FIG. 1, which will not be detailed here in this embodiment.

Figure 5:
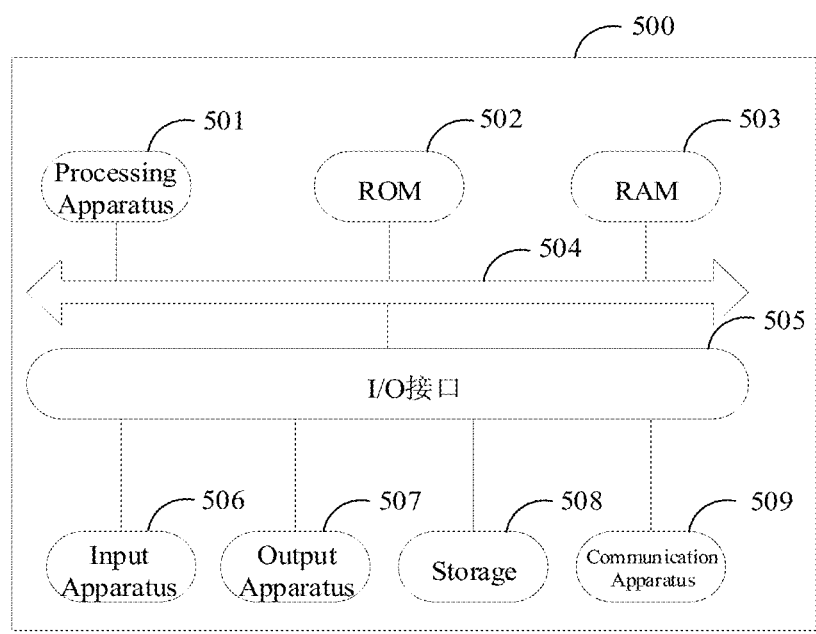
FIG. 5 is a structural schematic diagram of an electronic device provided by an embodiment of the present application.

Referring to FIG. 5, FIG. 5 shows a structural schematic diagram of an electronic device 500 suitable for implementing the embodiments of the present application. The terminal device in the embodiments of the present application may include, but is not limited to, mobile terminal such as mobile phone, notebook computer, digital broadcast receiver, PDA (Personal Digital Assistant), PAD (portable android device (tablet)), PMP (Portable Media Player), vehicle-mounted terminal (e.g., vehicle navigation terminal), etc., and stationary terminal such as digital TV (television), desktop computer, etc. The electronic device shown in FIG. 5 is merely an example, and should not bring any limitation to the functions and application scope of the embodiments of the present application.

As shown in FIG. 5, the electronic device 500 may include a processing apparatus (e.g., central processing unit, graphics processor, etc.) 501, which may perform various appropriate actions and processes according to a program stored in a read-only memory (ROM) 502 or a program loaded from a storage 508 into a random access memory (RAM) 503. In the RAM 503, various programs and data required for the operations of the electronic device 500 are also stored. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506 including, for example, touch screen, touch pad, keyboard, mouse, camera, microphone, accelerometer, gyroscope, etc.; an output apparatus 507 including, for example, liquid crystal display (LCD), speaker, vibrator, etc.; a storage 508 including, for example, magnetic tape, hard disk, etc.; and a communication apparatus 509. The communication apparatus 509 may allow the electronic device 500 to perform wireless or wired communication with other devices to exchange data. Although FIG. 5 shows an electronic device 500 with various apparatuses, it should be understood that it is not required to implement or provide all the apparatuses shown. Alternatively, more or less apparatuses may be implemented or provided.

In particular, according to an embodiment of the present application, the process described above with reference to the flowchart can be implemented as a computer software program. For example, an embodiment of the present application includes a computer program product comprising a computer program carried on a non-transient computer-readable medium, wherein the computer program contains program code for performing the method shown in the flowchart. In such an embodiment, the computer program can be downloaded and installed from the network through the communication apparatus 509, or installed from the storage 508 or from the ROM 502. The computer program, when executed by the processing apparatus 501, performs the above functions defined in the method of the embodiments of the present application.

The electronic device provided by the embodiments of the present application belongs to the same inventive concept as the message selection method provided by the above embodiments. The technical details not elaborately described in this embodiment can be found in the above embodiments. Moreover, this embodiment has the same beneficial effects as the above embodiments.

An embodiment of the present application provides a computer-readable medium having stored thereon a computer program, wherein the program, when executed by a processor, implements the message selection method as described in any of the above embodiments.

It should be noted that the above computer-readable medium in the present application may be a computer-readable signal medium or a computer-readable storage medium or any combination of both. The computer-readable storage medium may be, for example, but not limited to, an electrical, magnetic, optical, electromagnetic, infrared, or semiconductor system, apparatus or device, or any combination thereof. More specific examples of computer-readable storage media may include, but are not limited to, electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present application, computer-readable storage medium may be any tangible medium containing or storing a program, which may be used by or in conjunction with an instruction execution system, apparatus or device. In the present application, computer-readable signal medium may include data signals propagated in baseband or as part of a carrier wave, in which computer-readable program code is carried. Such propagated data signal may take many forms, including but not limited to electromagnetic signal, optical signal or any suitable combination thereof. Computer-readable signal medium may also be any computer-readable medium other than a computer-readable storage medium, and the computer-readable signal medium may send, propagate or transmit a program for use by or in conjunction with an instruction execution system, apparatus or device. The program code contained in the computer-readable medium may be transmitted by any appropriate medium, including but not limited to: wire, optical cable, RF (radio frequency) and the like, or any suitable combination thereof.

In some embodiments, a client or server may communicate by utilizing any currently known or future developed network protocol such as HTTP (HyperText Transfer Protocol), and may be interconnected with digital data communication in any form or medium (e.g., communication network). Examples of communication networks include local area network ("LAN"), wide area network ("WAN"), network of network (e.g., Internet) and end-to-end network (e.g., ad hoc end-to-end network), as well as any currently known or future developed network.

The above computer-readable medium may be included in the above electronic device, or may exist separately without being assembled into the electronic device.

The above computer-readable medium carries one or more programs which, when executed by the electronic device, cause the electronic device to perform the above message selection method.

The computer program code for performing the operations of the present application may be written in one or more programming languages or a combination thereof, including but not limited to object-oriented programming language, such as Java, Smalltalk, C++, etc., and conventional procedural programming language, such as "C" language or the like. The program code can be completely executed on a user computer, partially executed on the user computer, executed as an independent software package, partially executed on the user computer and partially executed on a remote computer, or completely executed on a remote computer or server. In the case involving a remote computer, the remote computer may be connected to the user computer through any kind of network, including local area network (LAN) or wide area network (WAN), or may be connected to an external computer (e.g., through the Internet using an Internet service provider).

The flowcharts and block diagrams in the accompanying drawings illustrate architectures, functions and operations of possible implementations of systems, methods and computer program products according to various embodiments of the present application. In this regard, each block in the flowcharts or block diagrams may represent a module, a program segment, or a part of code that contains one or more executable instructions for implementing specified logical functions. It should also be noted that, in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions.

The involved units described in the embodiments of the present application may be implemented either in software or in hardware. the name of the unit/module does not limit the unit itself in some case. For example, a voice data acquisition module may also be described as a "data acquisition module".

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present application, machine-readable medium may be tangible medium, which may contain or store a program for use by or in conjunction with an instruction execution system, apparatus or device. The machine-readable medium may be machine-readable signal medium or machine-readable storage medium. The machine-readable medium may include, but is not limited to, an electronic, magnetic, optical, electromagnetic, infrared, or semiconductor system, apparatus or device, or any suitable combination thereof. More specific examples of machine-readable storage medium may include electrical connection based on one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof.

According to one or more embodiments of the present disclosure, there is provided a message selection method comprising:
  displaying a first control in a message window in response to an operation of entering a message multi-selection mode triggered by a user, wherein the first control is used to select multiple message;
  determining a target position of the first control in a message in the message window in response to a position changing operation by the user on the first control;
  selecting messages below the target position in response to a triggering operation by the user on the first control.

According to one or more embodiments of the present disclosure, the determining the target position of the first control in the message in the message window in response to the position changing operation by the user on the first control comprises:
  determining the target position of the first control in the message in the message window according to the position to which the first control is finally dragged, in response to an operation by the user of dragging the first control in the message window;
  or,
  keeping the position of the first control in the message window unchanged, in response to a scrolling operation by the user on message content in the message window, and determining the message content displayed in the message window according to the scrolling operation.

According to one or more embodiments of the present disclosure, the method further comprises:
  displaying a second control in response to an operation of entering a message filtering mode triggered by the user, wherein the second control is used to select different types of messages;
  selecting messages corresponding to a target type below the target position, in response to a selecting operation on the target type in the second control by the user.

According to one or more embodiments of the present disclosure, the displaying the first control in the message window in response to the operation of entering the message multi-selection mode triggered by the user comprises:
  displaying a third control in response to a triggering operation by the user on a first message in the message window; and displaying the first control in the message window in response to a triggering operation by the user on the third control;
  or,
  displaying the first control in the message window in response to an operation of box-selecting multiple messages in the message window by the user.

According to one or more embodiments of the present disclosure, the selecting messages below the target position comprises:
  selecting all messages below the target position;
  or, selecting a preset upper limit number of messages below the target position, wherein the preset upper limit number is a maximum number of messages that can be selected.

According to one or more embodiments of the present disclosure, the method further comprises:
  displaying the preset upper limit number in the first control.

According to one or more embodiments of the present disclosure, the method further comprises:
  displaying a fourth control;
  jumping to a position where a last one of the selected messages is in response to a triggering operation by the user on the fourth control.

According to one or more embodiments of the present disclosure, the displaying the first control in the message window in response to the operation of entering a message multi-selection mode triggered by the user comprises:
  entering the message multi-selection mode and displaying the first control in the message window, in response to a triggering operation by the user and a number of messages in a conversation record being greater than or equal to a preset lower limit number of messages;
  or,
  entering the message multi-selection mode and displaying the first control in the message window, in response to a triggering operation by the user, the number of messages in the conversation record being smaller than the preset lower limit number of messages and the length of messages in the message window being greater than a preset length.

According to one or more embodiments of the present disclosure, the method further comprises:
  displaying a number of selected messages in the first control.

According to one or more embodiments of the present disclosure, the method further comprises:
  updating the number of selected messages displayed in the first control in real time in response to a deselecting operation on a portion of the selected messages by the user.

According to one or more embodiments of the present disclosure, there is provided a message selection apparatus comprising:
    a display unit, used to display a first control in a message window in response to an operation of entering a message multi-selection mode triggered by a user, wherein the first control is used to select multiple messages;
    a determination unit, used to determine a target position of the first control in a message in the message window in response to a position changing operation by the user on the first control;
    and
    a selection unit, used to select messages below the target position in response to a triggering operation by the user on the first control.

According to one or more embodiments of the present disclosure, the determination unit is specifically used to: determine the target position of the first control in the message in the message window according to the position to which the first control is finally dragged, in response to an operation by the user of dragging the first control in the message window; or keep the position of the first control in the message window unchanged, in response to a scrolling operation by the user on message content in the message window, and determine the message content displayed in the message window according to the scrolling operation.

According to one or more embodiments of the present disclosure, the display unit is further used to display a second control in response to an operation of entering a message filtering mode triggered by the user, wherein the second control is used to select different types of messages;
    the selection unit is specifically used to select a message corresponding to a target type below the target position in response to a selecting operation on the target type in the second control by the user.

According to one or more embodiments of the present disclosure, the display unit is specifically used to: display a third control in response to a triggering operation by the user on a first message in the message window; and display the first control in the message window in response to a triggering operation by the user on the third control; or display the first control in the message window in response to an operation of box-selecting multiple messages in the message window by the user.

According to one or more embodiments of the present disclosure, the selection unit is specifically used to: select all messages below the target position; or select a preset upper limit number of messages below the target position, wherein the preset upper limit number is a maximum number of messages that can be selected.

According to one or more embodiments of the present disclosure, the display unit is specifically used to display the preset upper limit number in the first control.

According to one or more embodiments of the present disclosure, the apparatus further comprises a jump unit;
    the display unit is further used to display a fourth control;
    the jump unit is used to jump to a position where the last one of the selected messages is in response to a triggering operation by the user on the fourth control.

According to one or more embodiments of the present disclosure, the display unit is specifically used to: enter the message multi-selection mode and display the first control in the message window, in response to a triggering operation by the user and a number of messages in a conversation record being greater than or equal to a preset lower limit number of messages; or enter the message multi-selection mode and display the first control in the message window, in response to a triggering operation by the user, the number of messages in the conversation record being smaller than the preset lower limit number of messages and the length of messages in the message window being greater than a preset length.

According to one or more embodiments of the present disclosure, the display unit is further used to display a number of selected messages in the first control.

According to one or more embodiments of the present disclosure, the apparatus further comprises an update unit;
    the update unit is used to update the number of selected messages displayed in the first control in real time in response to a deselecting operation on a portion of the selected messages by the user.

According to one or more embodiments of the present disclosure, there is provided an electronic device comprising a processor and a memory;
    the memory is used to store instructions or computer programs;
    the processor is used to execute the instructions or computer programs in the memory to cause the electronic device to perform the message selection method.

According to one or more embodiments of the present disclosure, there is provided a computer-readable storage medium comprising instructions which, when executed on a computer, cause the computer to perform the message selection method described above.

It should be noted that various embodiments in this specification is described in a progressive way, and the various embodiments focus on differences from each other, so it is necessary to refer to the same and similar parts among the various embodiments. As for a system or apparatus disclosed in the embodiments, since it corresponds to the method disclosed in the embodiments, the corresponding description is relatively simple, and the related points can be found in the illustration of the method part.

It should be understood that in the present application, "at least one (item)" means one or more, and "multiple" means two or more. The term "and/or", which is used to describe a relationship between associated objects, indicates that there can be three kinds of relationships. For example, "A and/or B" may indicate 3 cases: "only A", "only B", and "both A and B", where A and B may be singular or plural. The character "/" generally indicates an "or" relationship between the front and behind associated objects. The term "at least one (item) of the following" or similar expressions thereof refer to any combination of these items, including any combination of single item(s) or plural item(s). For example, at least one (item) of A, B or C may indicate: "A", "B", "C", "A and B", "A and C", "B and C", or "A and B and C", where A, B and C may be single or plural.

It should also be noted that in this document, the relational terms such as "first" and "second" are merely used to distinguish one entity or operation from another, and do not necessarily require or imply that there is any such actual relationship or order between these entities or operations. Moreover, the terms "include", "comprise" or any other variation thereof are intended to encompass non-exclusive inclusion, so that a process, method, article or device including a series of elements includes not only those elements, but also other elements not explicitly listed or elements inherent to such process, method, article or device. Without further limitations, an element defined by phrase "including a . . . " does not exclude the existence of other identical elements in the process, method, article or device including the said element.

The steps of a method or algorithm described in conjunction with the embodiments disclosed herein may be directly implemented in hardware, a software module executed by a processor, or a combination of both. The software module may be placed in random access memory (RAM), internal memory, read-only memory (ROM), electrically programmable ROM, electrically erasable programmable ROM, register, hard disk, removable disk, CD-ROM, or any other forms of storage medium known in the art.

The foregoing description of the disclosed embodiments enables those skilled in the art to implement or use the present application. Many modifications to these embodiments will be obvious to those skilled in the art, and the general principles defined herein can be implemented in other embodiments without departing from the spirit or scope of the present application. Therefore, the present application will not be limited to the embodiments shown herein, but is to conform to the widest scope consistent with the principles and novel features disclosed herein.

What is claimed is:

1. A message selection method, wherein the method comprises:
    displaying a first control in a message window in response to an operation of entering a message multi-selection mode triggered by a user, wherein the first control is used to select multiple messages;
    determining a target position of the first control in a message in the message window in response to a position changing operation by the user on the first control;
    selecting messages below the target position in response to a triggering operation by the user on the first control;
    displaying a number of selected messages in the first control; and
    updating the number of the selected messages displayed in the first control in real time in response to a deselecting operation on a portion of the selected messages by the user,
    wherein the determining the target position of the first control in the message in the message window in response to the position changing operation by the user on the first control comprises:
        keeping the position of the first control in the message window unchanged, in response to a scrolling operation by the user on message content in the message window, and determining the message content displayed in the message window according to the scrolling operation.

2. The method according to claim 1, wherein the method further comprises:
    displaying a second control in response to an operation of entering a message filtering mode triggered by the user, wherein the second control is used to select different types of messages;
    selecting messages corresponding to a target type below the target position, in response to a selecting operation on the target type in the second control by the user.

3. The method according to claim 1, wherein the displaying the first control in the message window in response to the operation of entering the message multi-selection mode triggered by the user comprises:
    displaying a third control in response to a triggering operation by the user on a first message in the message window; and displaying the first control in the message window in response to a triggering operation by the user on the third control;
    or,
    displaying the first control in the message window in response to an operation of box-selecting multiple messages in the message window by the user.

4. The method according to claim 1, wherein the selecting messages below the target position comprises:
    selecting all messages below the target position;
    or,
    selecting a preset upper limit number of messages below the target position, wherein the preset upper limit number is a maximum number of messages that can be selected.

5. The method according to claim 4, wherein the method further comprises:
    displaying the preset upper limit number in the first control.

6. The method according to claim 1, wherein the method further comprises:
    displaying a fourth control;
    jumping to a position where a last one of the selected messages is in response to a triggering operation by the user on the fourth control.

7. The method according to claim 1, wherein the displaying the first control in the message window in response to the operation of entering the message multi-selection mode triggered by the user comprises:
    entering the message multi-selection mode and displaying the first control in the message window, in response to a triggering operation by the user and a number of messages in a conversation record being greater than or equal to a preset lower limit number of messages;
    or,
    entering the message multi-selection mode and displaying the first control in the message window, in response to a triggering operation by the user, the number of messages in the conversation record being smaller than the preset lower limit number of messages and a length of messages in the message window being greater than a preset length.

8. An electronic device comprising a processor and a memory;
    the memory is used to store instructions or computer programs;
    the processor is used to execute the instructions or computer programs in the memory to cause the electronic device to perform a method, comprising:
    displaying a first control in a message window in response to an operation of entering a message multi-selection mode triggered by a user, wherein the first control is used to select multiple messages;
    determining a target position of the first control in a message in the message window in response to a position changing operation by the user on the first control;
    selecting messages below the target position in response to a triggering operation by the user on the first control;
    displaying a number of selected messages in the first control; and
    updating the number of the selected messages displayed in the first control in real time in response to a deselecting operation on a portion of the selected messages by the user,
    wherein the determining the target position of the first control in the message in the message window in response to the position changing operation by the user on the first control comprises:
        keeping the position of the first control in the message window unchanged, in response to a scrolling operation by the user on message content in the message window, and determining the message content displayed in the message window according to the scrolling operation.

9. A computer-readable non-volatile storage medium comprising instructions which, when executed on a computer, cause the computer to perform the method of claim 1.

10. A computer program product comprising a computer program carried on a non-transient computer-readable medium, wherein the computer program includes program code for performing the method of claim 1.

11. The electronic device according to claim 8, wherein the method further comprises:
  displaying a second control in response to an operation of entering a message filtering mode triggered by the user, wherein the second control is used to select different types of messages;
  selecting messages corresponding to a target type below the target position, in response to a selecting operation on the target type in the second control by the user.

12. The electronic device according to claim 8, wherein the displaying the first control in the message window in response to the operation of entering the message multi-selection mode triggered by the user comprises:
  displaying a third control in response to a triggering operation by the user on a first message in the message window; and displaying the first control in the message window in response to a triggering operation by the user on the third control;
  or,
  displaying the first control in the message window in response to an operation of box-selecting multiple messages in the message window by the user.

13. The electronic device according to claim 8, wherein the selecting messages below the target position comprises:
  selecting all messages below the target position;
  or,
  selecting a preset upper limit number of messages below the target position, wherein the preset upper limit number is a maximum number of messages that can be selected.

14. The electronic device according to claim 13, wherein the method further comprises:
  displaying the preset upper limit number in the first control.

15. The electronic device according to claim 8, wherein the method further comprises:
  displaying a fourth control;
  jumping to a position where a last one of the selected messages is in response to a triggering operation by the user on the fourth control.

* * * * *